United States Patent
Henderson et al.

(10) Patent No.: US 12,221,088 B2
(45) Date of Patent: Feb. 11, 2025

(54) METHOD FOR CONTROLLING PROPULSION OF A HEAVY-DUTY VEHICLE

(71) Applicant: VOLVO TRUCK CORPORATION, Gothenburg (SE)

(72) Inventors: Leon Henderson, Härryda (SE); Ramadan Salif, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 348 days.

(21) Appl. No.: 17/806,199

(22) Filed: Jun. 9, 2022

(65) Prior Publication Data

US 2022/0410853 A1    Dec. 29, 2022

(30) Foreign Application Priority Data

Jun. 24, 2021 (EP) .................................. 21181576

(51) Int. Cl.
*B60T 8/175* (2006.01)
*B60T 8/17* (2006.01)
(Continued)

(52) U.S. Cl.
CPC ............ *B60T 8/175* (2013.01); *B60T 8/1708* (2013.01); *B60T 8/171* (2013.01); *B60T 8/76* (2013.01);
(Continued)

(58) Field of Classification Search
CPC ........ B60T 8/175; B60T 8/1708; B60T 8/171; B60T 8/76; B60T 8/1701; B60T 2240/06;
(Continued)

(56) References Cited

U.S. PATENT DOCUMENTS

| 6,542,806 B1 | 4/2003 | Suhre et al. |
| 2004/0222027 A1* | 11/2004 | Barth ................ B60W 10/18 180/197 |

(Continued)

FOREIGN PATENT DOCUMENTS

| DE | 19849322 A1 | 4/2000 |
| DE | 102006007740 A1 | 8/2007 |

(Continued)

OTHER PUBLICATIONS

Extended European Search Report in corresponding European Application No. 21181576.6 dated Nov. 19, 2021 (10 pages).

*Primary Examiner* — Timothy Hannon
(74) *Attorney, Agent, or Firm* — Venable LLP; Jeffri A. Kaminski

(57) ABSTRACT

A method for controlling propulsion of a heavy-duty vehicle includes. configuring a nominal shaft slip of the drive shaft in dependence of a desired longitudinal wheel force to be generated by the driven axle, wherein a shaft slip is indicative of a difference between a current vehicle velocity and a vehicle velocity corresponding to the rotation speed of the drive shaft, obtaining a rotation speed of the left wheel and a rotation speed of the right wheel, as function of a current shaft slip of the driven axle, estimating a peak shaft slip value associated with an open differential peak longitudinal force of the driven axle, based on the current shaft slip and on the corresponding obtained speeds of the left and right wheels, and controlling propulsion of the heavy-duty vehicle unit by setting the current shaft slip of the drive shaft based on the configured nominal shaft slip adjusted in dependence of the estimated peak shaft slip value.

17 Claims, 6 Drawing Sheets

(51) Int. Cl.
*B60T 8/171* (2006.01)
*B60T 8/76* (2006.01)
*B60W 10/04* (2006.01)
*B60W 30/18* (2012.01)
*B60W 10/184* (2012.01)

(52) U.S. Cl.
CPC ...... *B60W 10/04* (2013.01); *B60W 30/18027* (2013.01); *B60W 30/18172* (2013.01); *B60T 2240/06* (2013.01); *B60T 2250/04* (2013.01); *B60T 2270/86* (2013.01); *B60W 10/184* (2013.01); *B60W 2300/12* (2013.01); *B60W 2520/10* (2013.01); *B60W 2520/266* (2013.01); *B60W 2520/28* (2013.01); *B60W 2710/06* (2013.01); *B60W 2710/08* (2013.01)

(58) Field of Classification Search
CPC ............. B60T 2240/02; B60T 2250/04; B60T 2270/86; B60T 2270/213; B60K 28/16; B60W 10/04; B60W 10/184; B60W 30/18027; B60W 30/18172; B60W 30/02; B60W 30/18181; B60W 2300/12; B60W 40/072; B60W 40/105; B60W 40/12; B60W 2520/10; B60W 2520/266; B60W 2520/28; B60W 2710/06; B60W 2710/08; B60W 2540/18

See application file for complete search history.

(56) References Cited

U.S. PATENT DOCUMENTS

| | | | |
|---|---|---|---|
| 2016/0082972 A1* | 3/2016 | Fairgrieve | B60W 50/14 701/84 |
| 2016/0214486 A1* | 7/2016 | Suzuki | B60L 50/52 |
| 2017/0232848 A1* | 8/2017 | Lian | B60W 30/18172 701/22 |
| 2018/0134156 A1 | 5/2018 | Nonaka et al. | |
| 2019/0176784 A1* | 6/2019 | Laine | B60T 8/172 |
| 2019/0322256 A1* | 10/2019 | Tha | B60T 8/176 |
| 2022/0105943 A1* | 4/2022 | Oh | B60T 8/175 |

FOREIGN PATENT DOCUMENTS

| | | |
|---|---|---|
| DE | 102019004158 A1 | 1/2020 |
| EP | 1396402 B1 | 6/2006 |
| EP | 3569436 A1 | 11/2019 |
| GB | 2560590 A | 9/2018 |
| WO | 2004067307 A1 | 8/2004 |

* cited by examiner

METHOD FOR CONTROLLING PROPULSION OF A HEAVY-DUTY VEHICLE

TECHNICAL FIELD

The present disclosure relates to methods and control units for ensuring safe and efficient vehicle motion management of a heavy-duty vehicle. The methods are particularly suitable for use with cargo transporting vehicles, such as trucks and semi-trailers. The invention can, however, also be applied in other types of heavy-duty vehicles, e.g., in construction equipment and in mining vehicles, as well as in cars.

BACKGROUND

Heavy-duty vehicles, such as trucks and semi-trailer vehicles, are designed to carry heavy loads. The heavily laden vehicles must be able to start from standstill also in uphill conditions and accelerate reliably on various types of road surfaces.

Excessive wheel slip occurs when too much torque is applied to an axle, or to a wheel compared to what is supported by the current road friction and normal load of the wheel. Excessive wheel slip is undesired since it results in an unpredictable vehicle behavior, increased tyre wear, loss of tractive force, and also in an energy inefficient operation.

A differential drive arrangement allows a single power source, such as a combustion engine or an electric machine, to power both wheels on a driven axle. An open differential drive arrangement distributes torque evenly over the driven axle. However, in scenarios where one wheel starts to spin faster than the other wheel, for instance due to varying friction conditions, the power transferred to the wheels will differ. This problem may become especially pronounced in so-called split friction conditions, where severely sub-optimal propulsion can be experienced.

EP1396402B1 discloses a method for controlling motion of a heavy-duty vehicle, where the vehicle comprises an open differential driven axle, and where the vehicle wheel forces are controlled based on a wheel slip target.

US2018134156 discusses a reduction of the target slip value in response to a large wheel speed difference.

However, despite the advancements to-date, there is a continuing need for further improvements in vehicle motion management in heavy-duty vehicles, and in particular for vehicles comprising open differential drive arrangements.

SUMMARY

It is an object of the present disclosure to provide techniques which alleviate or even overcome at least some of the above-mentioned problems. This object is at least in part obtained by a method for controlling propulsion of a heavy-duty vehicle, where the heavy-duty vehicle comprises a drive shaft connected to a differential drive arrangement arranged to evenly distribute torque between a left wheel and a right wheel of a driven axle. The method comprises configuring a nominal shaft slip of the drive shaft in dependence of a desired longitudinal wheel force to be generated by the driven axle, wherein a shaft slip is indicative of a difference between a current vehicle velocity and a vehicle velocity corresponding to the rotation speed of the drive shaft. The method also comprises obtaining a rotation speed of the left wheel and a rotation speed of the right wheel, as function of a current shaft slip of the driven axle, and estimating a peak shaft slip value associated with an open differential peak longitudinal force of the driven axle, based on the current shaft slip and on the corresponding obtained speeds of the left and right wheels. The method further comprises controlling propulsion of the heavy-duty vehicle unit by setting the current shaft slip of the drive shaft based on the configured nominal shaft slip adjusted in dependence of the estimated peak shaft slip value.

This way variation in, e.g., normal force acting on the wheels of the riven axle, or variation in friction conditions experienced by the two wheels, can be quickly adapted for by adjusting the shaft slip. The adjustment in shaft slip can be performed very fast, and the vehicle control becomes more responsive compared to the slower and higher threshold traditional traction control systems. The methods disclosed herein are compatible with legacy traction control systems, and may represent a good complement to traction control systems.

According to aspects, a relationship between shaft slip and longitudinal wheel force is given by an inverse tyre model. The method may then comprise initially obtaining this inverse tyre model. The inverse tyre model describes a functional relationship between shaft slip and generated longitudinal wheel force over the driven axle. This inverse tyre model may be pre-configured or adapted in run-time. The model may be a low complexity model involving just a linear relationship and a peak point, or a more accurate model. Additional input parameters may be used to increase the model accuracy, such as parameters related to vehicle type, tyre properties, tyre wear, temperature, and so on. The methods described herein are applicable with a wide range of different tyre models of varying complexity, which is an advantage.

According to aspects, the speed of the left wheel and the speed of the right wheel are obtained from respective wheel axle speed sensors. Wheel axle speed sensors are relatively low cost sensors and also robust. A wheel speed sensor may be realized using various physical principles, such as a Hall effect sensor, or using magnetic markers. Acoustic sensors may also be used to determine wheel speed.

According to aspects, the peak shaft slip value is estimated as a shaft slip value where a magnitude of a difference between the speed of the left wheel and the speed of the right wheel crosses a pre-configured first threshold. It has been realized that a robust way to determine the obtainable peak shaft slip is to monitor wheel speed difference over the axle, optionally compensated for vehicle curvature or steering wheel angle. The peak shaft slip value can be identified as the shaft slip value where the wheel speeds start to diverge significantly.

According to aspects, the peak shaft slip value is estimated based on correlating a change in shaft slip with a corresponding change in wheel speed of the slowest spinning wheel out of the left wheel and the right wheel. The peak shaft slip value may be estimated as a shaft slip value where the correlation between shaft speed change and wheel speed change turns from positive to negative. As will be explained in the following, the peak shaft slip value is normally the operating point where the slower spinning of the two wheels start to decrease in wheel speed or wheel slip with an increase in shaft slip. In other words, when the slower spinning wheel no longer increases its speed in response to an increase in shaft slip, the peak shaft slip operating point has likely been passed. In other words, the peak shaft slip value may be advantageously estimated as the shaft slip value which maximizes the smaller of the obtained speed of the left wheel and the obtained speed of the right wheel.

According to aspects, the method also comprises controlling the shaft slip of the drive shaft by reducing the nominal shaft slip of the drive shaft to a value below the peak shaft slip value in case the nominal shaft slip exceeds the peak shaft slip. This control strategy is likely to maintain traction in case of a sudden change in traction condition. The vehicle may then maintain momentum in, e.g., an uphill drive scenario, which is an advantage. The control based on shaft slip may be implemented as a low latency control, compared to traditional traction control systems which may be more slow to react, and which may require larger margins before triggered.

According to aspects, the method also comprises controlling the shaft slip of the drive shaft to be equal to the peak shaft slip value. This control strategy provides optimal traction, in a sense. It may be used with advantage during launch and in scenarios where maximum traction force without brake intervention is desired.

According to aspects, the drive shaft slip is controlled according to a bandwidth constraint, where the bandwidth constraint is smaller for a decreasing controlled shaft slip compared to an increasing drive shaft slip. This means that shaft slip is fast to decrease and slow to increase, providing a responsive yet robust control of the heavy-duty vehicle.

According to aspects, the method further comprises triggering a service brake traction control intervention procedure in case the magnitude of the difference between the speed of the left wheel and the speed of the right wheel exceeds a pre-determined second threshold. In other words, the herein disclosed methods are advantageously combined with traditional traction control systems based on friction brake intervention.

There is also disclosed herein control units, vehicle units, computer programs, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
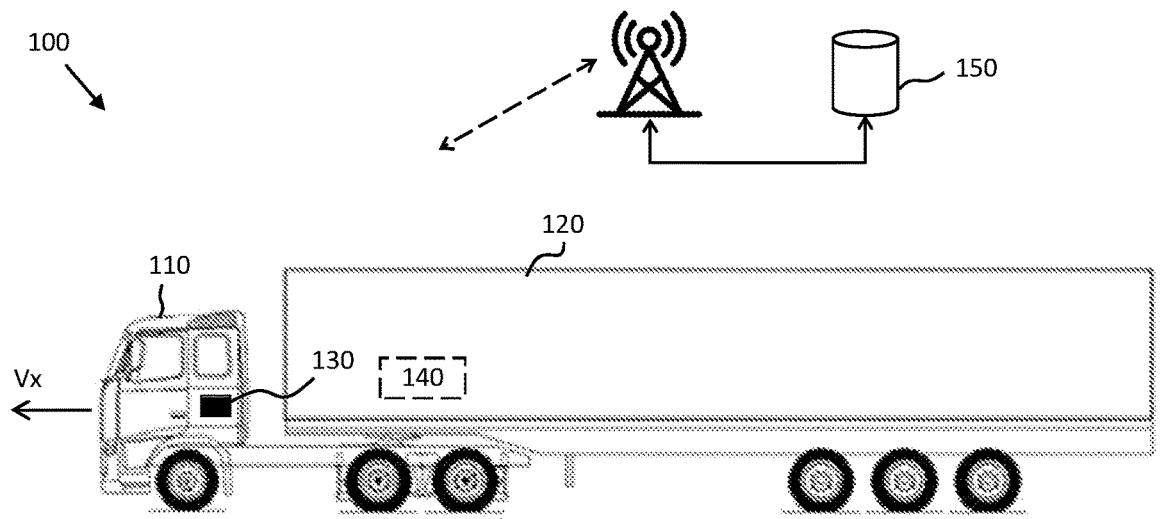
FIG. 1 schematically illustrates a vehicle for cargo transport.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a heavy-duty vehicle 100. This particular example comprises a tractor unit 110 which is arranged to tow a trailer unit 120. The tractor 110 comprises a vehicle electronic control unit (ECU) 130 arranged to control various functions of the vehicle 100. For instance, the ECU may be arranged to perform a vehicle motion management (VMM) function comprising control of wheel slip, vehicle unit stability, and so on. The trailer unit 120 optionally also comprises an ECU 140, which then controls one or more functions on the trailer 120. The ECU or ECUs may be communicatively coupled, e.g., via wireless link, to a remote server 150. This remote server may be arranged to perform configuration of the ECU, and to provide various forms of data to the ECU 130, such as providing data regarding the make and type of tyres mounted on the vehicle 100, and information related to a relationship between generated wheel force and wheel slip, i.e., an inverse tyre model, as will be discussed in more detail below in connection to FIG. 3.

The vehicle combination 100 may of course also comprise additional vehicle units, such as one or more dolly units and more than one trailer unit. The techniques disclosed herein are applicable to rigid trucks, and also to passenger cars, although the main benefit of the proposed technique is obtained when used with heavy-duty vehicles for cargo transport.

A trailer 120 (and also a dolly unit) may be self-powered, i.e., comprise an on-board power source for generating propulsion torque based on control signals generated by the trailer ECU 140, and/or by the tractor ECU 130. The techniques disclosed herein may be performed separately by the tractor 110, separately by the trailer 120 (or dolly), or by a combination of the tractor 110 and trailer 120.

Figure 2:
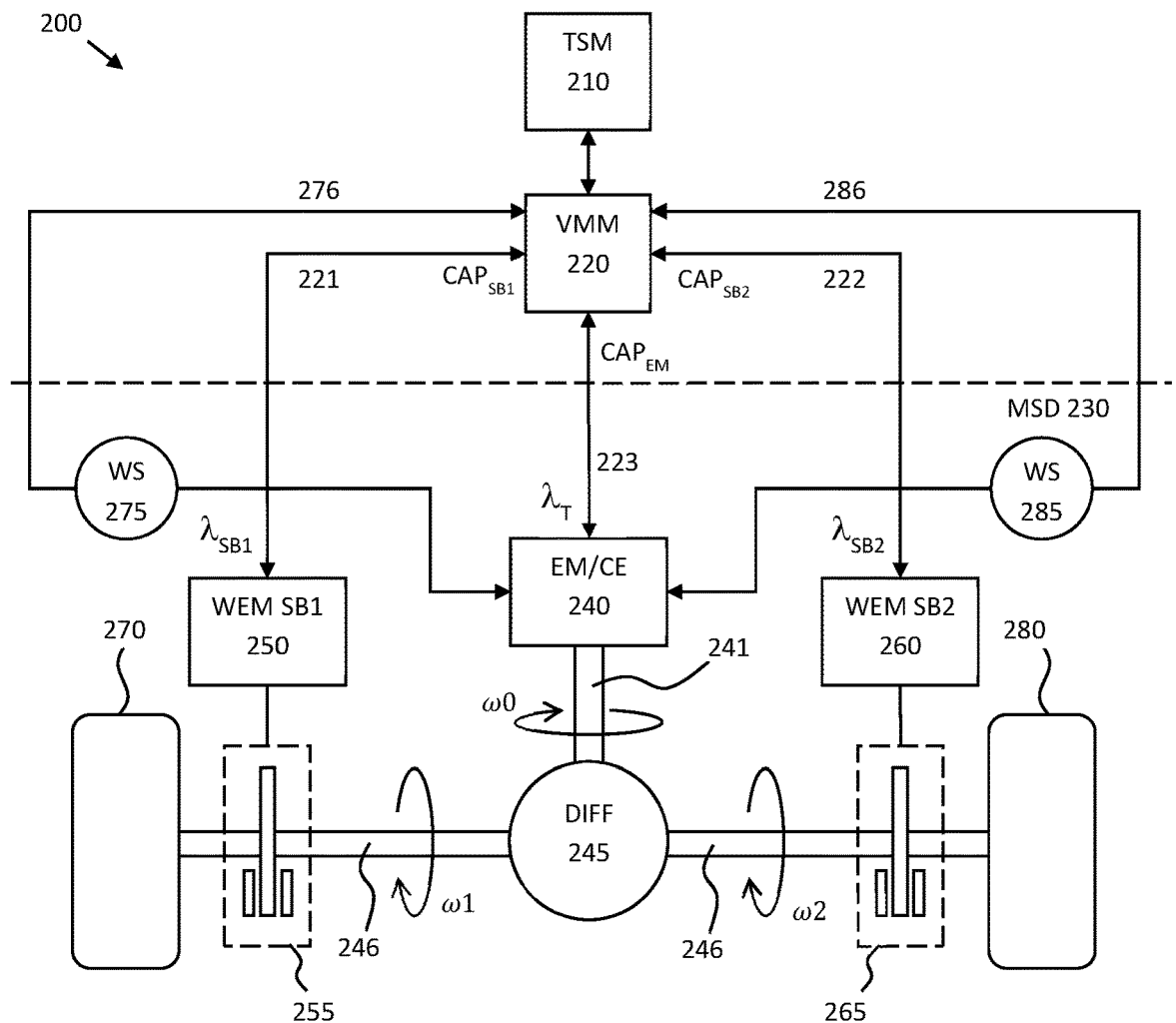
FIG. 2 shows a driven axle with an open differential drive arrangement.

FIG. 2 schematically illustrates functionality 200 for controlling a left wheel 270 and a right wheel 280 of a driven axle 246 by some example motion support devices (MSDs), here comprising friction brakes 255, 265 (such as disc brakes or drum brakes) and a propulsion device 240 such as an electric machine (EM) or a combustion engine (CE). The friction brakes 255, 265 and the propulsion device 240 are examples of wheel torque generating devices, which may also be referred to as actuators and which can be controlled by one or more motion support device control units 250, 260. In this example the service brakes SB1, SB2 are assumed to be controlled by respective wheel end module (WEM) controllers 250, 260, while the propulsion device 240 comprises an integrated control unit not shown in FIG. 2.

The propulsion device 240 is connected to the driven axle 246 via a differential drive arrangement 245. This differential drive arrangement may, e.g., be an open differential which distributes torque evenly over the two wheels. In an open differential drive arrangement, the drive shaft speed $\omega_0$ is the average of the wheel axle speeds $\omega_1$, $\omega_2$ (disregarding any gear ratios in-between). If one of the wheels 270, 280 suddenly experiences reduced friction, or a reduction in normal force $F_z$ acting on the wheel, then the wheel speed of that wheel increases while the speed of the other wheel decreases. This often means that overall propulsion force decreases, since neither of the wheels are operating in its desired operating point with respect to wheel speed (one is spinning too fast, while the other is rotating at a wheel speed below the optimal point). Many modern heavy-duty vehicle therefore implement traction control systems where the friction brakes 255, 265 are used to transfer torque from the spinning low-friction side wheel to the high friction side wheel. However, this type of control intervention is normally associated with considerable latency, which may cause a vehicle to lose momentum and get stuck in uphill driving scenario. Also friction brake intervention may be undesirable due to, e.g., increased energy consumption, increased brake component wear, and increased friction brake temperature.

Each wheel 270, 280 is associated with a wheel speed sensor 275, 285, which continuously determines the current rotational velocity $\omega_1$, $\omega_2$ of the respective wheel. There is also a sensor which determines the drive shaft rotation speed $\omega_0$. The drive shaft speed sensor may be integrated with an electric machine, or arranged separately from the propulsion unit 240 in connection to the shaft 241, e.g., in the form of a Hall sensor or the like. This wheel speed and shaft speed information 276, 286 is fed back to the different control units, such as the control unit of the EM/CE, and the control unit of the friction brakes 250, 260. The wheel speed and shaft speed data may also be fed back to the VMM module 220. A control unit or module having access to vehicle velocity (optionally translated into a velocity in the coordinate system of a given wheel), and wheel speed data, may determine wheel slip very accurately, and with fast update rate. This allows the different actuators to perform very fast and accurate slip control, fast enough to respond in case the vehicle suddenly experiences change in friction conditions on one or both wheels 270, 280 or the driven axle 246.

Propulsion of a heavy-duty vehicle like the vehicle 100 has traditionally been handled using control loops based on torque requests from the control unit 130 to the various actuators. However, the torque-based control loops of a heavy-duty vehicle are normally associated with time constants on the order of 10 ms or so. This means that there is considerable delay from the configuration of a given torque until the feedback from the vehicle motion sensors are fed back to the control unit that generated the request. In some scenarios this time constant reduces overall vehicle control bandwidth to a point where the startability and overall vehicle motion management of the heavy-duty vehicle may be negatively affected, especially when road friction is uneven at the different wheels.

To improve control during, e.g., vehicle launch it is proposed herein to base propulsion control on drive axle slip requests (or, equivalently, drive axle rotation speed relative to the vehicle speed) instead of on torque requests. This means that the propulsion device on the vehicle 100 is requested by the ECU 130 or 140 to maintain a certain driven axle rotation speed $\omega_0$ relative to the vehicle speed over ground. For instance, if a target drive axle slip is set at 0.1, then the driven axle rotational velocity will be continuously set at a relative difference of 0.1 above the corresponding vehicle velocity so that the wheels of the vehicle will always be slipping by the configured amount, at least when averaged over the driven axle. Notably, this control strategy is different compared to just imposing a wheel slip limit, and performing torque-based on control of the propulsion as long as the wheel slip stays below the configured wheel slip limit.

A traffic situation management (TSM) function 210 plans driving operations with a time horizon of, e.g., 1-10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 220 which performs force allocation to meet the requests from the TSM in a safe and robust manner, based at least in part based on capability reports (CAP) received from the various MSD control units.

Desired acceleration profiles and curvature profiles may optionally be determined based on input from a driver via a human machine interface of the heavy-duty vehicle via normal control input devices such as a steering wheel, accelerator pedal and brake pedal, although the techniques disclosed herein are just as applicable with autonomous or semi-autonomous vehicles. The exact methods used for determining the acceleration profiles and curvature profiles is not within scope of the present disclosure and will therefore not be discussed in more detail herein.

Both the friction brakes 255, 265 and the propulsion device 240 interact with the road surface via the tyres on the wheels 270, 280. Thus, the tyre properties and behavioral characteristics have an impact on how the different control actions by the friction brakes and the propulsion device generate vehicle motion. A tyre is subject to a longitudinal force $F_x$, a lateral force $F_y$, and a normal force F. The normal force $F_z$ is key to determining some important vehicle properties. For instance, the normal force to a large extent determines the achievable longitudinal tyre force $F_x$ by the wheel since, normally, $F_x \leq \mu F_z$, where $\mu$ is a friction coefficient associated with a road friction condition. This and other important relationships related to wheel force and wheel slip is described in, e.g., "Tyre and vehicle dynamics", Elsevier Ltd. 2012, ISBN 978-0-08-097016-5, by Hans Pacejka.

A software-based tyre model is optionally comprised in the system. This tyre model provides information about the tyre currently mounted on the wheel, its properties, and behavioral characteristics. The tyre model may, as mentioned above, be implemented as a look-up table or other type of function. The tyre model is parameterized, i.e., defined, by one or more tyre parameters. This means that the function itself varies in dependence of the tyre properties. The tyre model can be used to model various relationships, such as a relationship or mapping between wheel slip and generated wheel force, and/or a mapping between tyre wear rate and vehicle state such as tyre normal load, vehicle speed, and wheel slip. It is appreciated that the present disclosure is not limited to any particular form of tyre model structure. Rather, it is appreciated that many different types of mathematical and/or experimentally based functions and mappings can be used as the tyre model.

The tyre model can be used to define a relationship between longitudinal tyre force $F_x$ for a given wheel and an equivalent longitudinal wheel slip for the wheel. Longitudinal wheel slip $\lambda_x$ relates to a difference between wheel rotational velocity and speed over ground and will be discussed in more detail below. Wheel, axle or shaft rotation speed w is a rotational speed given in units of, e.g., rotations per minute (rpm) or angular velocity in terms radians/second (rad/sec) or degrees/second (deg/sec). The wheel behavior in terms of wheel force generated in longitudinal direction (in the rolling direction) and/or lateral direction (orthogonal to the longitudinal direction) as function of wheel slip is discussed in "Tyre and vehicle dynamics", Elsevier Ltd. 2012, ISBN 978-0-08-097016-5, by Hans Pacejka. See, e.g., chapter 7 where the relationship between wheel slip and longitudinal force is discussed.

Longitudinal wheel slip $\lambda_x$ may, in accordance with SAE J670 (SAE Vehicle Dynamics Standards Committee Jan. 24, 2008) be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between $-1$ and $1$ and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

Lateral wheel slip $\lambda_y$ can be defined as $$\lambda_y = \frac{v_y}{\max(|R\omega|, |v_x|)}$$

or, alternatively, $$\lambda_y = \arctan\left(\frac{v_y}{v_x}\right)$$

where $v_y$ is the lateral speed of the wheel (in the coordinate system of the wheel), measured on a direction orthogonal to the direction of the longitudinal speed $v_x$. The present disclosure relates primarily to longitudinal wheel slip, although it is appreciated that the two are connected, mainly since the ability to generate lateral wheel force depends strongly on the longitudinal wheel slip.

It is also possible to define a shaft slip A, $$\lambda = \frac{K\omega_0 - v_x}{\max(|K\omega_0|, |v_x|)}$$

where K represents a conversion factor between axle speed $\omega_0$ and vehicle speed $v_x$, including any in-between gear ratios and the like, such that $K\omega_0 = v_x$ at zero wheel slip for both wheels and at equal wheel speeds. The shaft slip is a measure of the difference between the rotational speed of the drive shaft 241 compared to the speed of the vehicle over ground, accounting for factors such as gear ratios, wheel diameters, and the like. Thus, a positive shaft slip means that at least some positive longitudinal force is being generated.

Figure 3:
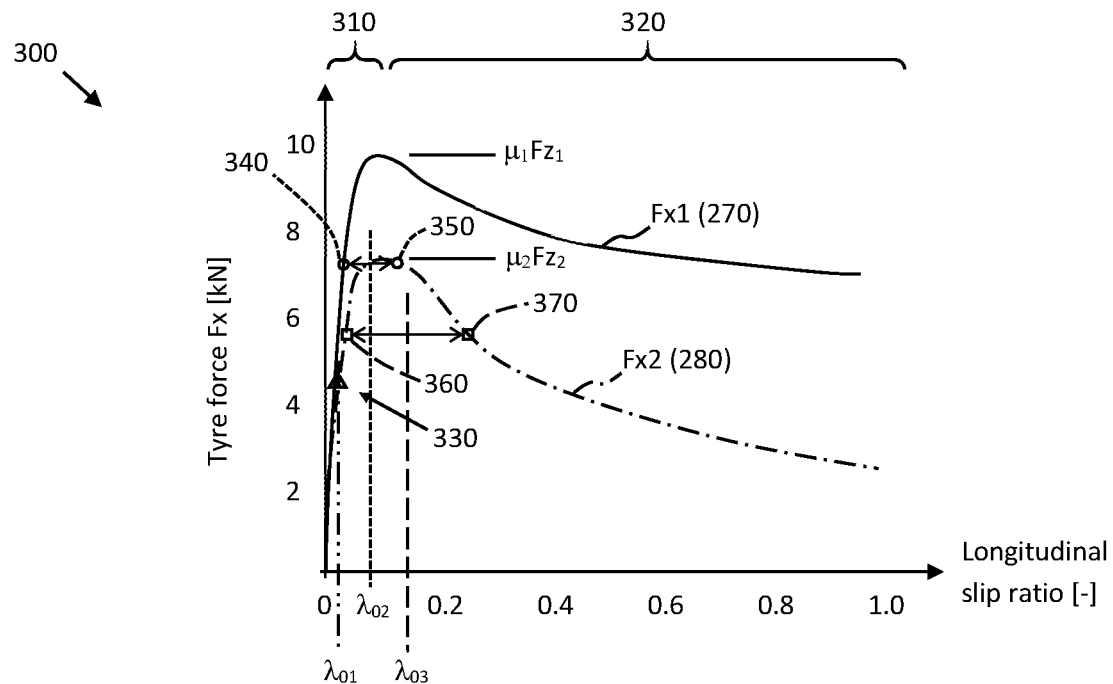
FIG. 3 is a graph showing an example of a tyre model.

In order for a wheel (or tyre) to produce a wheel force, slip must occur. For smaller slip values the relationship between slip and generated force are approximately linear, where the proportionality constant is often denoted as the slip stiffness of the tyre. FIG. 3 shows a graph 300 illustrating an example of achievable longitudinal tyre forces $F_{x1}$, $F_{x2}$, for the two wheels of an open differential driven axle, as function of wheel slip. The longitudinal tyre force shows an almost linearly increasing part 310 for small wheel slips, followed by a part 320 with more non-linear behavior for larger wheel slips. It is desirable to maintain vehicle operation in the linear region 310, where the obtainable longitudinal force in response to an applied brake or propulsion command is easier to predict.

In this case, the product of road friction coefficient and normal force is larger for the left wheel 270 compared to the right wheel 280, i.e., the peak force $\mu_1$, $F_{z1}$, which can be supported by the left wheel 270 is much larger than the peak force supported by the right wheel 280 $\mu_2 F_{z2}$. Depending on the configured nominal shaft slip value $\lambda_0$, the two wheel speeds $\omega_1$, $\omega_2$ are likely to differ by variable amounts. Consider the shaft slip value $\lambda_{01}$. This relatively low shaft slip of about 0.02 is well within the linear operating range 310 for both tyres, and the wheel slips 330 caused by the shaft slip $\lambda_{01}$ are therefore similar. If the shaft slip is increased to $\lambda_{02}$, the right wheel slip 350 will pass over its peak force point, while the left wheel slip 340 still has not reached full longitudinal force potential. The applied force on the shaft cannot be increased much beyond this point since it will merely increase the wheel slip of the right wheel and start to reduce the wheel slip of the left wheel (and the generated longitudinal force). For instance, if a shaft slip $\lambda_{03}$ is configured, then the force generated by both wheels has decreased compared to the shaft slip $\lambda_{02}$, since the wheel slip 360 of the left wheel is severely sub-optimal, and so is the wheel slip 370 of the right wheel. Furthermore, the right wheel 280 is about to spin out of control.

It is appreciated that the curves in FIG. 3 are merely illustrative examples, and the actual relationships between slip and force may be more complex. In particular, the appearance of the tyre curves in the non-linear region 320 may vary in dependence of a number of different parameters. This is one reasons for wanting to keep both wheels within the linear region 310, or at least not too far into the non-linear region 320.

To avoid the type of situation where one wheel spins fast and the other almost not at all, traditional traction control systems can be used, which apply friction brakes to transfer drive torque to the high-friction side of the driven axle. However, these traction control systems normally require quite substantial wheel speed differences before kicking in, and are also relatively slow to react, which may cause a heavily-laden vehicle to loose momentum and get stuck, which is undesirable.

To improve traction control of heavy-duty vehicles with open differentials in scenarios where friction and/or normal tyre load only differ by a smaller amount over the driven axle, where traction control systems are not necessary to activate, it is proposed herein to estimate the shaft slip value corresponding to peak driven axle longitudinal force over the driven axle, and to control shaft speed in relation to this shaft slip value. The speed or slip control of the drive shaft can be performed with very low latency, i.e., the system can be made quick enough to respond fast to changes in friction condition on the two sides of an open differential drive arrangement. In some case the traction control provided by the proposed methods are superior to the legacy systems which use friction brakes to transfer torque. In some cases the proposed control methods are able to quickly respond to a change in traction conditions, and prevent the vehicle from coming to a stand-still in, e.g., a hill, from which it could be very difficult to start again. Thus, it is appreciated that the herein disclosed techniques present a valuable complement to the traditional traction control systems, and should not be seen as an alternative to traction control using friction brakes to transfer torque from one side to the other of a differential drive arrangement.

To estimate the peak shaft slip value, the wheel speeds are monitored in order to see how wheel speed develops in response to changes in configured shaft slip. According to a first principle of estimation, the wheel speed difference is monitored, and a large wheel speed difference is taken as indication that the peak shaft slip value has been exceeded. According to a second principle of estimation, the correlation between a change in shaft slip and a change in wheel speeds is used. Of course, the two principles of estimation can be used in parallel in order to increase robustness. The two approaches to estimating the peak shaft slip value can also be used together, e.g., by weighting the two estimates together into a joint estimate.

A traction control system can be triggered by a fast increase in the shaft slip limit, or shaft slip setting. If there is a difference in normal force or friction coefficient, then a large axle slip setting will cause a large wheel speed difference, which is likely to trigger traction control intervention.

Figure 8A:
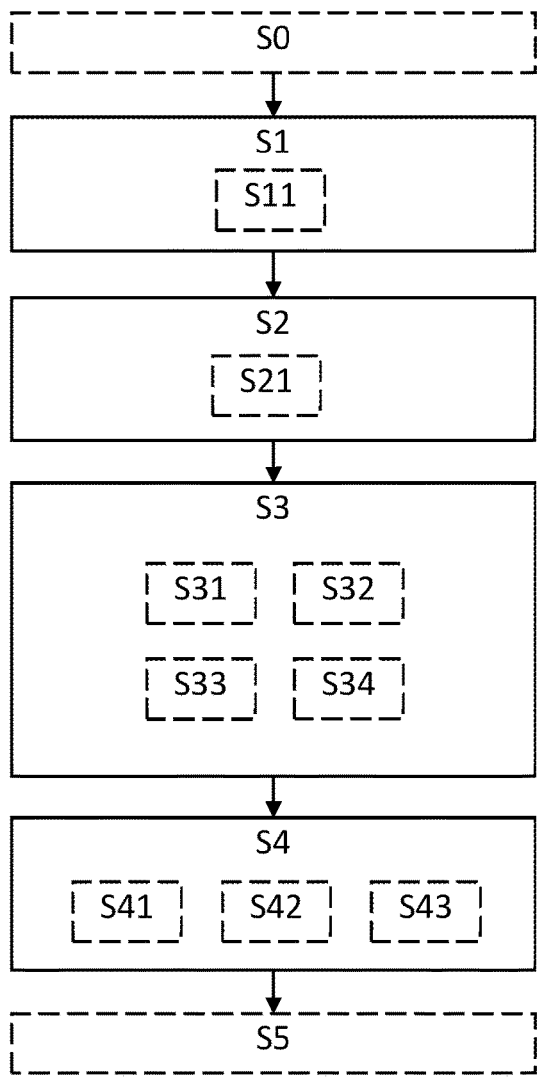
FIGS. 8A-B are flow charts illustrating example methods.

The flow chart in FIG. 8A summarizes the proposed control methods. There is disclosed herein a method for controlling propulsion of a heavy-duty vehicle 100, 110, 120, where the heavy-duty vehicle 100, 110, 120 comprises a drive shaft 241 connected to a differential drive arrangement 245 arranged to evenly distribute torque between a left wheel 270 and a right wheel 280 of a driven axle 246. The method comprises configuring S1 a nominal shaft slip $\lambda_0$ of the drive shaft 241 in dependence of a desired longitudinal wheel force $F_x$ to be generated by the driven axle 246. This means that the motion requests from, e.g., the driver or from an autonomous or semi-autonomous processing unit, is translated into desired longitudinal force, and mapped to corresponding shaft slip, using an inverse tyre model such as that discussed in connection to FIG. 3, or a more simple form of look-up table or the like. An example of an overall control system using the herein proposed methods will be discussed below in connection to FIG. 5. Here, a shaft slip $\lambda$ is indicative of a difference between a current vehicle velocity $v_x$ and a vehicle velocity corresponding to the rotation speed $\omega_0$ of the drive shaft 241, as discussed above. Shaft slip $\lambda$ may, as noted above, be formally defined S11 as $$\lambda = \frac{K\omega_0 - v_x}{\max(|K\omega_0|, |v_x|)}$$

where K represents a conversion factor between drive shaft speed $\omega_0$ and vehicle speed $v_x$, such that $K\omega_0=v_x$ at zero wheel slip for both wheels and at equal wheel speeds.

The relationship between shaft slip $\lambda$ and longitudinal wheel force $F_x$ may be given by an inverse tyre model 300, such as that discussed in connection to FIG. 3, and the method may comprise initially obtaining S0 this inverse tyre model. The tyre model may, e.g., be configured at the factory, or updated continuously in dependence of vehicle type and overall condition. As mentioned above, the tyres play an important part in the realization of the tyre model, hence, a current state of the tyres may be accounted for when determining the tyre model. The tyre model may be obtained from the remote server 150, in response to uploading a current vehicle state. This way the vehicle may gather data about, e.g., current load, tyre state, an other vehicle parameters and send this to the remote server 150. The remote server 150 may then process the data and determine an inverse tyre model that accurately describes the current relationship between wheel or drive axle slip and generated longitudinal force. This processing may also be performed locally, by the ECU 130 or by the ECU 140. However, an advantage of performing the processing by the server 150, is that the data from other vehicles can also be used in constructing the tyre model, leading to a more accurate model.

According to some aspects, one or both ECUs 130, 140 are configured to feed wheel speed difference data to the remote server 150 via the wireless link. This allows the remote server to maintain a map of split-μ locations, where a vehicle risks experiencing sub-optimal traction. The remote server 150 may then send out warning to other vehicles approaching such locations. A vehicle approaching a location where another vehicle has experienced sub-optimal traction may, e.g., adjust speed and avoid stopping in an uphill slope.

The method also comprises obtaining S2 a rotation speed $\omega 1$ of the left wheel and a rotation speed $\omega 2$ of the right wheel, as function of a current shaft slip $\lambda$ of the driven axle 246. The wheel speeds may be obtained from wheel speed sensors 275, 285 as separate values. However, some aspects of the herein disclosed methods only require wheel speed difference. The data from the sensors 275, 285 may be pre-processed, perhaps by filtering to suppress measurement noise. The wheel speed data or the wheel speed difference data is time aligned with the current axle slip, such that at each point in time, there is a possibility to investigate which wheel speeds that were generated by a given current axle slip. Thus, as discussed above, the control unit performing the method may detect, e.g., an increase in wheel speed difference and can then respond by reducing the drive shaft slip in order to maintain traction. This response time can be made very short, especially if the methods are being performed at the MSD layer 230, close to the actuators and to the wheels.

As discussed above, the method comprises estimating S3 a peak shaft slip value $\lambda_{max}$ associated with an open differential peak longitudinal force $F_{x,max}$ of the driven axle 246, based on the current shaft slip $\lambda$ and on the corresponding obtained speeds $\omega_1$, $\omega_2$ of the left and right wheels. Two different principles for this estimation will be discussed below. These underlying principles are based on the realization that the two wheel speeds start to diverge when the shaft slip passes the peak shaft slip value, due to the properties of the open differential drive arrangement. When this happens, the slower spinning wheel is also likely to experience a reduction in wheel speed (and in wheel slip), since more and more power is transferred to the fast spinning wheel.

The method also comprises controlling S4 propulsion of the heavy-duty vehicle unit 100, 110, 120 by setting the current shaft slip $\lambda$ of the drive shaft 241 based on the configured nominal shaft slip $\lambda_0$ adjusted in dependence of the estimated peak shaft slip value $\lambda_{max}$.

According to some aspects, the method comprises controlling S41 the shaft slip $\lambda$ of the drive shaft 241 by reducing the nominal shaft slip $\lambda_0$ of the drive shaft 241 to a value below the peak shaft slip value $\lambda_{max}$ in case the nominal shaft slip $\lambda_0$ exceeds the peak shaft slip $\lambda_{max}$. This is akin to using the peak shaft slip as a slip limit which is no to be exceeded. This essentially means that a dynamic shaft slip limit is implemented, which will be adjusted very rapidly in response to changing friction conditions. The nominal shaft slip is used for controlling drive shaft speed as long as the nominal shaft slip is below the peak shaft slip $\lambda_{max}$. The methods can also be used with advantage to maximize tractive force, e.g., when launching a heavy-duty vehicle from stand-still or from a low speed. In this case, the method may comprise controlling S42 the shaft slip $\lambda$ of the drive shaft 241 to be equal to the peak shaft slip value $\lambda_{max}$, i.e., the peak shaft slip value is used as the nominal shaft slip.

Figure 4A:
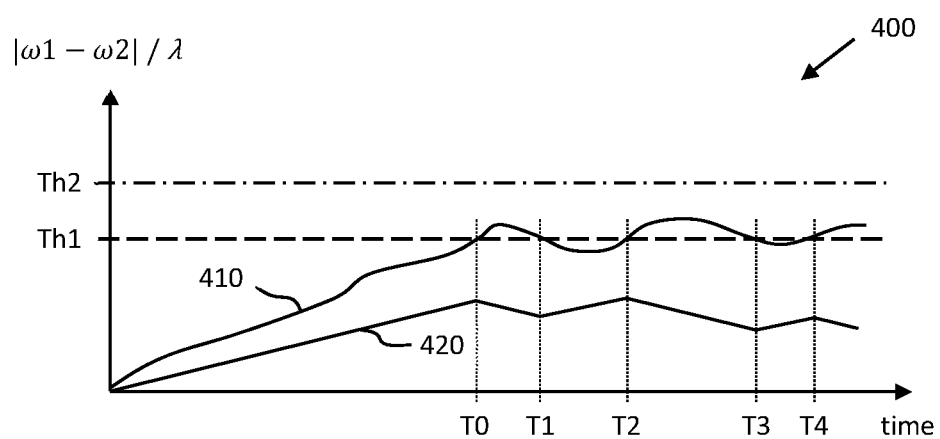
FIGS. 4A-C illustrate vehicle control in a varying friction condition.

The peak shaft slip value $\lambda_{max}$ can, as mentioned above, be estimated S31 as a shaft slip value where a magnitude of a difference between the speed $\omega 1$ of the left wheel and the speed $\omega 2$ of the right wheel crosses a pre-configured first threshold Th1. This is illustrated in the graph 400 in FIG. 4A, which shows time on the x-axis and wheel speed difference $|\omega 1-\omega 2|$ as well as drive shaft slip $\lambda$ on the y-axis. The curve 410 represents example wheel speed difference while the curve 420 represents corresponding example configured shaft slip. The vehicle is accelerated, perhaps from stand-still. Thus, the shaft slip is increased as some rate. As the shaft slip is increased, the wheel speeds start to diverge, perhaps due to variation in friction at the two wheels, or different normal loads. The two wheels may also have differently work tyres. At time T0, the wheel speed difference breaches a pre-determined first threshold Th1. When this happens, it is assumed that the peak shaft slip value $\lambda_{max}$ has been reached and passed. Consequently, any further increase in shaft slip will only reduce longitudinally generated force by the driven axle, which of course is undesired. Thus, in response to breaching the first threshold Th1, the shaft slip is immediately reduced. At time T1 the reduction in shaft slip has brought the wheel slip difference back below the first threshold Th1, which means that the shaft slip can again be increased carefully. At time T2 the first threshold is once again breached, whereupon the shaft slip is again reduced. This periodic behavior is then maintained, and the configured shaft slip will fluctuate about the peak shaft slip value.

It is appreciated that some differences in wheel speeds are expected, such as when the vehicle is cornering. Thus, according to some aspects the obtained speed $\omega 1$ of the left wheel and the obtained speed $\omega 2$ of the right wheel is adjusted S33 based on a vehicle path curvature $c_{req}$ and/or on a vehicle steering angle $\delta$. The adjustment may be based on a model of the vehicle, which may simply be a look-up table with adjustment values listed as function of vehicle steering angle.

The methods discussed herein can of course be combined with more traditional types of traction control, where friction brakes are used to transfer torque away from the spinning wheel to the wheel with better friction conditions.

Figure 4B:
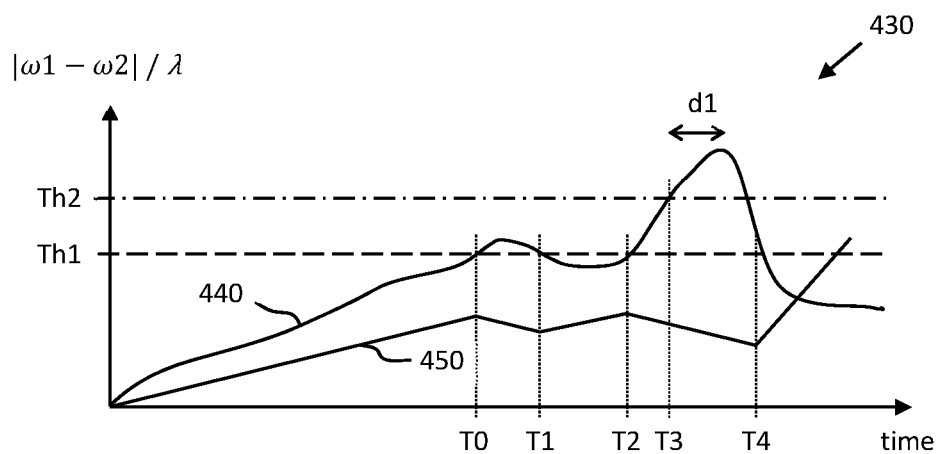

Aspects of the herein disclosed methods also comprise triggering S5 a service brake traction control intervention procedure in case the magnitude of the difference between the speed $\omega 1$ of the left wheel and the speed $\omega 2$ of the right wheel exceeds a pre-determined second threshold Th2. This is illustrated in the graph 430 shown in FIG. 4B, where the wheel speed difference is shown as curve 440 and the shaft slip is shown as curve 450. At time T3, the wheel speed difference breaches the second threshold Th2, where the traction control system kicks in, albeit after a delay d1. This activation generates a strong reduction in wheel speed difference. When the traction control system kicks in, the shaft slip control is inactivated, since now additional shaft slip can be applied.

Figure 4C:
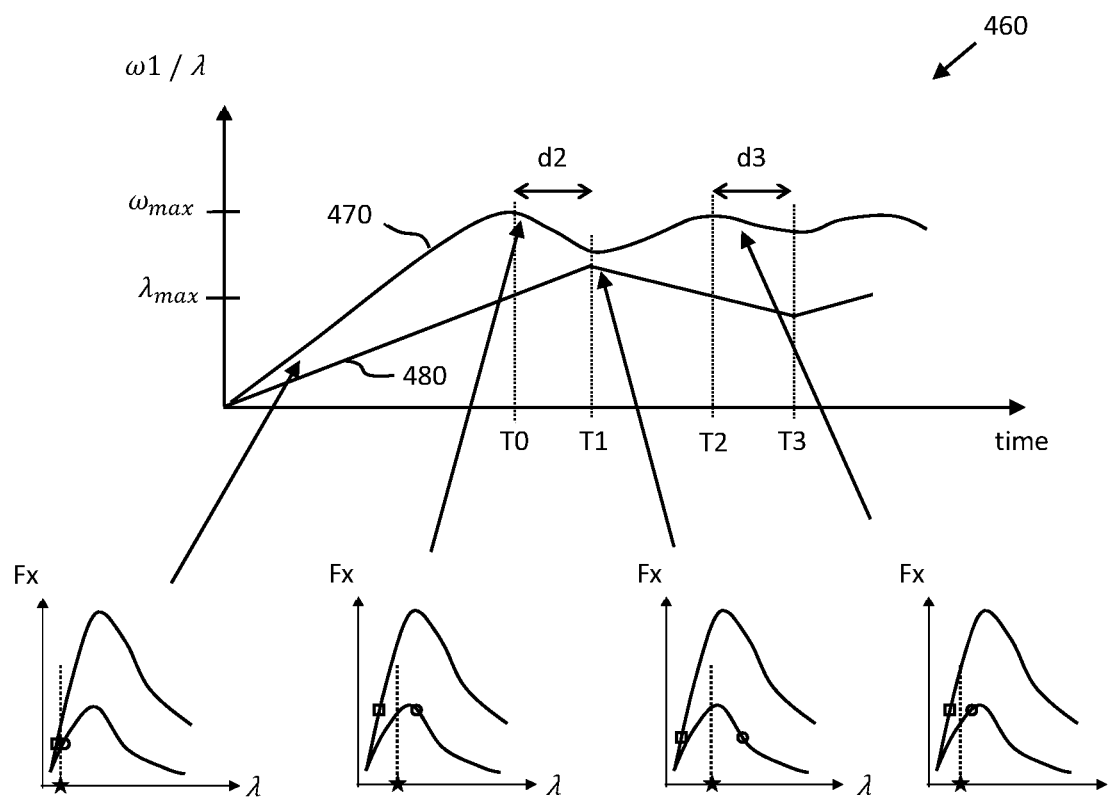

The peak shaft slip value $\lambda_{max}$ can also be estimated S32 based on correlating a change in shaft slip with a corresponding change in wheel speed of the slowest spinning wheel out of the left wheel 270 and the right wheel 280. The peak shaft slip value $\lambda_{max}$ is then estimated as a shaft slip value where the correlation between shaft speed change and wheel speed change turns from positive to negative. Of course, both approaches to estimating the peak shaft slip value can be used jointly, and the results merged, possibly after weighting. The graph 460 in FIG. 4C shows an example operation of the second approach. The curve 470 illustrates example wheel speed of the slower spinning wheel out of the left wheel 270 and the right wheel 280. The curve 480 illustrates the current shaft slip of the drive shaft 241. The vehicle is initially accelerated, and the shaft slip is therefore increased. This increase in shaft slip causes an increase in the wheel speed of the slower spinning wheel. The correlation between change in shaft slip and change in wheel speed is positive at first, i.e., an increase in shaft slip results in an increase in wheel speed, and a decrease in shaft slip results in a corresponding decrease in wheel speed. Of course, correlation between shaft slip and wheel slip can also be used in the correlation analysis. At time T0, however, the correlation between shaft speed change and wheel speed change turns from positive to negative, i.e., the wheel speed starts to decrease despite the shaft slip still increasing. This behavior, as discussed above, indicates that the other wheel has passed its peak, and that the increase in wheel speed of the faster spinning wheel results in a decrease in wheel speed of the slower spinning wheel. After some detection delay d2 needed to ensure that there actually is a change in correlation behavior, the shaft slip is reduced (which happens at time T1). This reduction in shaft slip results in that the speed of the slower spinning wheel again starts to increase, and the wheel speed will again start to fluctuate around its preferred value.

In a similar manner, the peak shaft slip value can be estimated as the shaft slip value which maximizes the smaller of the obtained speed of the left wheel and the obtained speed of the right wheel. The control then comprises adjusting the shaft slip and monitoring what happens with the wheel speeds as the shaft slip is changed. For instance, if when shaft slip is increased and the lowest speed wheel's slip increases and the high speed wheel's slip increases then continue to increase the shaft slip since this will generate more traction force, however, if shaft slip is increased and the low speed wheel decreases slip, then the shaft slip should be decreased since further increase in shaft slip will lead to reduced traction force. If shaft slip is instead decreased and both wheels decrease in slip, then shaft slip should be increased for more traction force. According to some aspects, the control comprises applying a probing shaft slip control pattern involving both increase and decrease in shaft slip, in order to determine the gradient of the longitudinal force with respect the shaft slip. By monitoring wheel slip responses to the probing pattern, the longitudinal force gradient with respect to shaft slip can be determined, or at least the sign of the gradient.

This allows the control unit to know if increased shaft slip will lead to increased or decreased traction force. This probing pattern of the shaft slip may be a sinusoidal or sawtooth pattern comprising increases and decreases in wheel slip according to a pre-determined pattern. The probing pattern may be applied in response to detecting a divergence in wheel slip. The probing pattern may also be applied regularly during vehicle launch.

It may be desirable to quickly reduce the shaft slip $\lambda$ when wheel speeds start to diverge, and to more slowly bring the shaft slip $\lambda$ back towards the nominal shaft slip $\lambda_0$ once the wheel speeds start to converge again. For instance, a target shaft slip $\lambda_T$ to be maintained may be iteratively updated using a step-length w, as $$\lambda_T^{(k+1)} = w(\lambda_0 - \lambda_T^{(k)})$$

where k is an iteration index. The magnitude of w determines the bandwidth constraint. A large w allows for rapid convergence, and vice versa. The magnitude of w may be selected as a function of the rate of change in the wheel speed difference, i.e., if $$|\omega_1^{(k)} - \omega_2^{(k)}| < |\omega_1^{(k+1)} - \omega_2^{(k+1)}|$$

then wheel speed difference is increasing and w is then selected larger compared to the case where $$|\omega_1^{(k)} - \omega_2^{(k)}| > |\omega_1^{(k+1)} - \omega_2^{(k+1)}|$$

To summarize, according to some aspects, the drive shaft slip is controlled S43 according to a bandwidth constraint, where the bandwidth constraint is smaller for a decreasing controlled shaft slip compared to an increasing drive shaft slip $\lambda$.

Figure 8B:
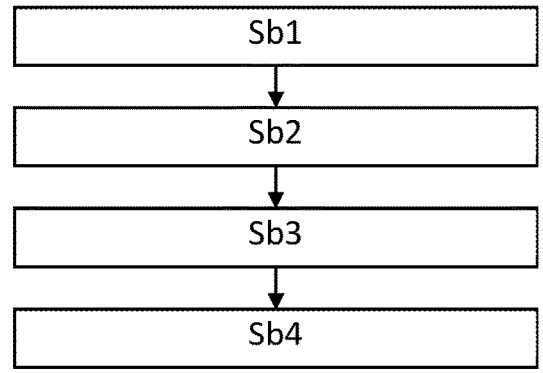

It is appreciated that the herein disclosed methods may be advantageously used to launch a heavy-duty vehicle from stand-still or from a low speed. FIG. 8B illustrates a method for launching a heavy-duty vehicle 100 from stand-still, where the heavy-duty vehicle 100, 110, 120 comprises a drive shaft 241 connected to a differential drive arrangement 245 arranged to evenly distribute torque between a left wheel 270 and a right wheel 280 of a driven axle 246. The method comprises increasing Sb1 a rotation speed $\omega 0$ of the drive shaft 241 at a pre-determined rate of increase, obtaining Sb2 a rotation speed $\omega 1$ of the left wheel and a rotation speed $\omega 2$ of the right wheel, as function of a current shaft slip $\lambda$ of the driven axle 246, wherein a shaft slip is indicative of a difference between a current vehicle velocity $v_x$ and a vehicle velocity corresponding to the rotation speed $\omega 0$ of the drive shaft 241, and estimating Sb3 a peak shaft slip value $\lambda_{max}$ associated with an open differential peak longitudinal force $F_{x,max}$ of the driven axle 246, based on the current shaft slip $\lambda$ and on the corresponding obtained speeds $\omega_1$, $\omega_2$ of the left and right wheels, and maintaining Sb4 rotation speed $\omega 0$ of the drive shaft 241 to generate a shaft slip $\lambda$ equal to the peak shaft slip value $X_{max}$.

Figure 5:
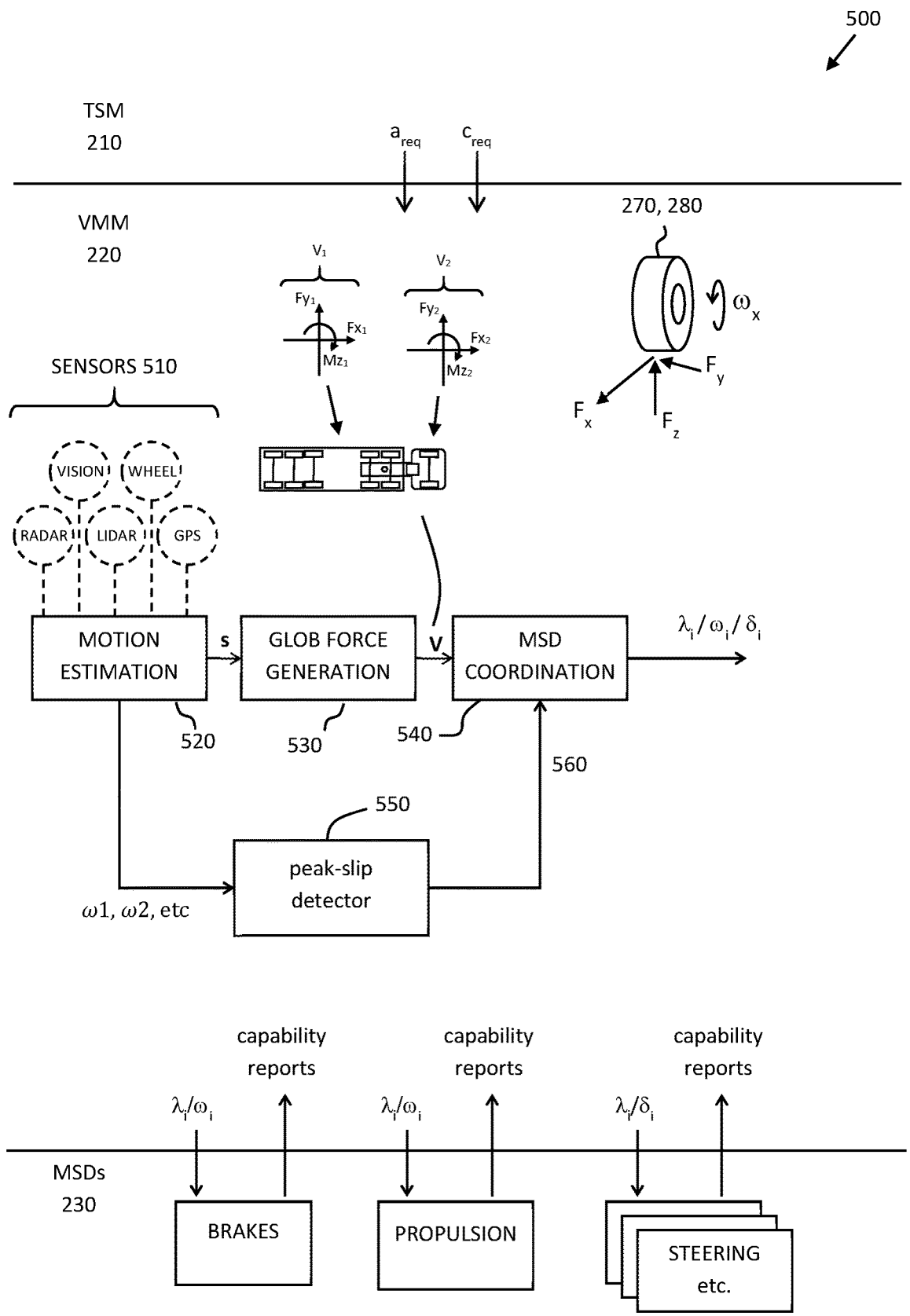
FIG. 5 shows a control architecture for controlling a heavy-duty vehicle.

FIG. 5 shows an example of a vehicle control stack 500 comprising the above-mentioned TSM 210 and VMM 220 functions, where the proposed technique may be implemented with advantage. Sensors 510 arranged to provide data about the vehicle environment provides input to the overall control stack 500, and a connection to remote processing resources, such as cloud-based processing resources like the remote server 150 in FIG. 1 are also optionally comprised in the control stack.

As mentioned above, the VMM function 210 operates with a time horizon of about 0.1-1.5 seconds or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. The accuracy of this control is improved by means of the advanced tyre models 380 discussed herein.

The VMM function 210 performs vehicle state or motion estimation 520, i.e., the VMM function 210 continuously determines a vehicle state s (often a vector variable) comprising positions, speeds, accelerations, yaw motions, normal forces and articulation angles of the different units in the vehicle combination by monitoring vehicle state and behavior using various sensors 510 arranged on the vehicle 100, often but not always in connection to the MSDs.

The result of the motion estimation 520, i.e., the estimated vehicle state s, is input to a global force generation module 530 which determines the required global forces on the vehicle units which need to be generated in order to meet the motion requests from the TSM 210. An MSD coordination function 540 allocates, e.g., wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100. As indicated in FIG. 5, the MSD coordination function 540 may output any of wheel slips $\lambda_i$, wheel rotation speeds $\omega$, and/or steering angles $\delta_1$ to the different MSDs.

A peak-slip detector module 550 is arranged to monitor wheel speeds and to perform some or all of the different methods discussed herein. The peak-slip detector may also be arranged to intervene in case the wheel speeds diverge and or start to exhibit inverse proportional relationship with the shaft slip. When this happens, a control signal can be sent to the MSD coordination module 540 which will reduce the configured shaft slip in response to the control signal 560.

Figure 6:
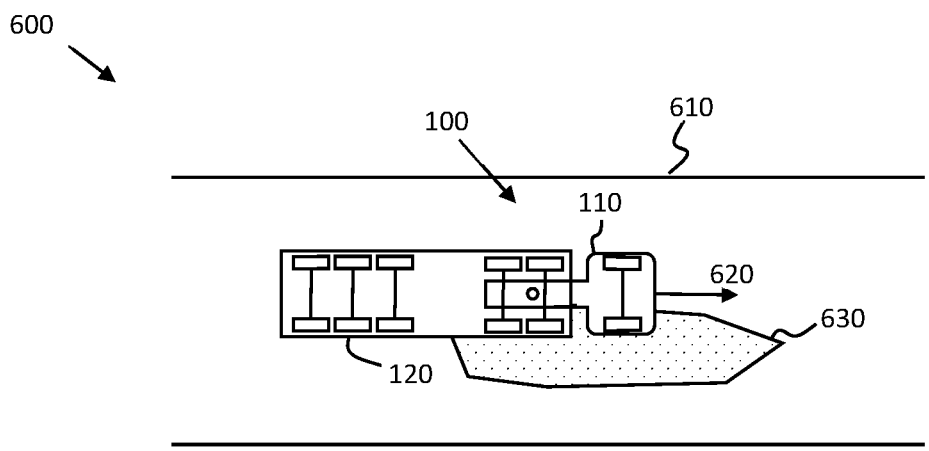
FIGS. 6-7 illustrate different split friction operating scenarios.

FIG. 6 illustrates an example split-$\mu$ scenario 600, where a heavy-duty vehicle 100 drives straight on a road 610 in a forward direction with vehicle velocity $v_x$ 620. A region of low friction 630 is encountered by the right wheels of the vehicle 100. When this happens, the right-hand side wheels may start to spin faster than the left-hand side wheels, giving rise to the sub-optimal operating points illustrated in FIG. 3, i.e., where one wheel is to the right of the nominal desired slip and the other wheel is to the left of the desired operating point. The herein proposed techniques will then quickly step in and reduce the shaft slip down to a level where the speed of the spinning wheel is reduced, thus improving overall traction very fast, much faster than would have been possible using legacy traction control system based on slow torque-based control of service brakes. The methods proposed herein also act in a more continuous manner, and may be configured to activate already at small wheel speed differences. Traction control system often require larger wheel speed differences before they kick in, due to robustness reasons.

Figure 7:
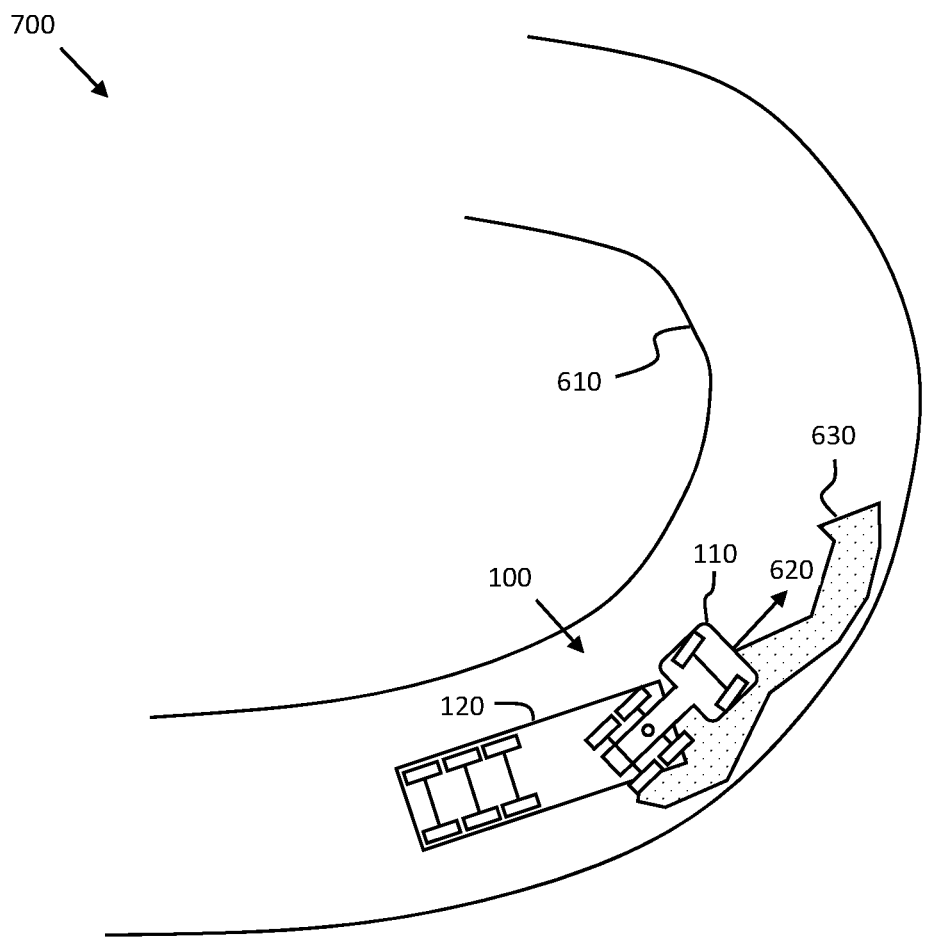

FIG. 7 illustrates another example scenario 700, but now the vehicle is cornering, i.e., follows a path associated with a curvature. The curvature itself gives rise to a difference in wheel speeds. This wheel speed difference is preferably accounted for by the method, i.e., such wheel speed differences due to planned curve taking will optionally not result in a modified shaft slip. However, the vehicle 100 encounters a region 630 of low friction, which causes the wheel speed difference to deviate from that expected from the curvature, which may cause a reduction in shaft slip request to the propulsion device.

Figure 9:
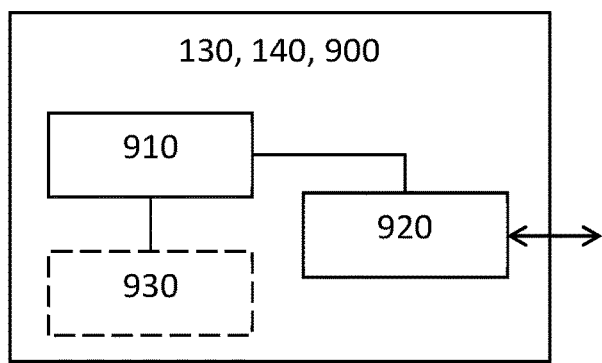
FIG. 9 schematically illustrates a sensor unit and/or a control unit.

FIG. 9 schematically illustrates, in terms of a number of functional units, the components of a control unit 900 according to embodiments of the discussions herein, such as any of the VUCs 130, 140. This control unit 900 may be comprised in the articulated vehicle 100. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 900 to perform a set of operations, or steps, such as the methods discussed in connection to FIG. 8A and FIG. 8B. For example, the storage medium 930 may store the set of operations, and the processing circuitry 910 may be configured to retrieve the set of operations from the storage medium 930 to cause the control unit 700 to perform the set of operations. The set of operations may be provided as a set of executable instructions. Thus, the processing circuitry 910 is thereby arranged to execute methods as herein disclosed.

Thus, there is also disclosed herein a control unit 130 arranged to control propulsion of a heavy-duty vehicle 100, where the heavy-duty vehicle 100 comprises a differential drive arrangement 245 arranged in connection to a driven axle 246 with a left wheel 270 and a right wheel 280.

The storage medium 930 may also comprise persistent storage, which, for example, can be any single one or combination of magnetic memory, optical memory, solid state memory or even remotely mounted memory.

The control unit 700 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 700, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
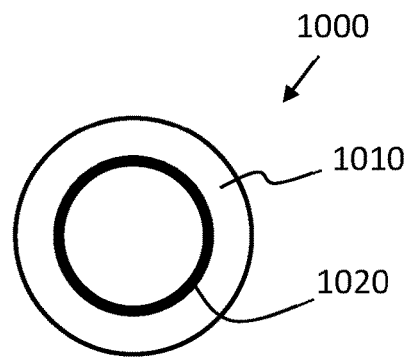
FIG. 10 shows an example computer program product.

FIG. 10 illustrates a computer readable medium 1010 carrying a computer program comprising program code means 1020 for performing the methods illustrated in FIGS. 8A-B, when said program product is run on a computer. The computer readable medium and the code means may together form a computer program product 1000.

The invention claimed is:

1. A method for controlling propulsion of a heavy-duty vehicle, where the heavy-duty vehicle comprises a drive shaft connected to a differential drive arrangement arranged to evenly distribute torque between a left wheel and a right wheel of a driven axle, the method comprising
configuring a nominal shaft slip of the drive shaft in dependence of a desired longitudinal wheel force to be generated by the driven axle, wherein a shaft slip is indicative of a difference between a current vehicle velocity and a vehicle velocity corresponding to the rotation speed of the drive shaft,
obtaining a rotation speed of the left wheel and a rotation speed of the right wheel, as function of a current shaft slip of the driven axle,
estimating a peak shaft slip value associated with an open differential peak longitudinal force of the driven axle, based on the current shaft slip and on the corresponding obtained speeds of the left and right wheels, and
controlling propulsion of the heavy-duty vehicle unit by setting the current shaft slip of the drive shaft based on the configured nominal shaft slip adjusted in dependence of the estimated peak shaft slip value.

2. The method according to claim 1, where a relationship between shaft slip and longitudinal wheel force is given by an inverse tyre model, the method comprising initially obtaining this inverse tyre model.

3. The method according to claim 1, where shaft slip is defined as $$\lambda = \frac{K\omega_0 - v_x}{\max(|K\omega_0|, |v_x|)}$$

where K represents a conversion factor between drive shaft speed $\omega_0$ and vehicle speed $v_x$, such that $K\omega_0 = v_x$ at zero wheel slip for both wheels and at equal wheel speeds wherein $\max(|Kw_0|, |v_x|)$ represents a maximum value of $|Kw_0|$ and $|v_x|$.

4. The method according to claim 1, where the speed of the left wheel and the speed of the right wheel are obtained from respective wheel axle speed sensors.

5. The method according to claim 1, wherein the peak shaft slip value is estimated as a shaft slip value where a magnitude of a difference between the speed of the left wheel and the speed of the right wheel crosses a preconfigured first threshold.

6. The method according to claim 1, wherein the peak shaft slip value is estimated based on correlating a change in shaft slip with a corresponding change in wheel speed of the slowest spinning wheel out of the left wheel and the right wheel, wherein the peak shaft slip value is estimated as a shaft slip value where the correlation between shaft speed change and wheel speed change turns from positive to negative.

7. The method according to claim 1, wherein the obtained speed of the left wheel and the obtained speed of the right wheel is adjusted based on a vehicle path curvature and/or on a vehicle steering angle.

8. The method according to claim 1, wherein the peak shaft slip value is estimated as the shaft slip value which maximizes the smaller of the obtained speed of the left wheel and the obtained speed of the right wheel.

9. The method according to claim 1, comprising controlling the shaft slip of the drive shaft by reducing the nominal shaft slip of the drive shaft to a value below the peak shaft slip value in case the nominal shaft slip exceeds the peak shaft slip.

10. The method according to claim 1, comprising controlling the shaft slip of the drive shaft to be equal to the peak shaft slip value.

11. The method according to claim 1, where the drive shaft slip is controlled according to a bandwidth constraint, where the bandwidth constraint is smaller for a decreasing controlled shaft slip compared to an increasing drive shaft slip.

12. The method according to claim 1, comprising triggering a service brake traction control intervention procedure in case the magnitude of the difference between the speed of the left wheel and the speed of the right wheel exceeds a pre-determined second threshold.

13. A non-transitory computer readable medium carrying a computer program comprising program code for performing the steps of claim 1 when said program code product is run on a computer or on processing circuitry of a control unit.

14. A non-transitory computer-readable storage medium comprising instructions, which when executed by processing circuitry, cause the processing circuitry to perform the method of claim 1.

15. A control unit arranged to control propulsion of a heavy-duty vehicle, where the heavy-duty vehicle comprises a drive shaft connected to a differential drive arrangement arranged to evenly distribute torque between a left wheel and a right wheel of a driven axle, the control unit comprising processing circuitry arranged to configure a nominal shaft slip of the drive shaft in dependence of a desired longitudinal wheel force to be generated by the driven axle, wherein a shaft slip is indicative of a difference between a current vehicle velocity and a vehicle velocity corresponding to the rotation speed of the drive shaft,
    obtain a rotation speed of the left wheel and a rotation speed of the right wheel, as function of a current shaft slip of the driven axle,
    estimate a peak shaft slip value associated with an open differential peak longitudinal force of the driven axle, based on the current shaft slip and on the corresponding obtained speeds of the left and right wheels, and
    control propulsion of the heavy-duty vehicle unit by setting the current shaft slip of the drive shaft based on the configured nominal shaft slip adjusted in dependence of the estimated peak shaft slip value.

16. A vehicle unit comprising a control unit according to claim 15.

17. A method for launching a heavy-duty vehicle from stand-still, where the heavy-duty vehicle comprises a drive shaft connected to a differential drive arrangement arranged to evenly distribute torque between a left wheel and a right wheel of a driven axle, the method comprising
    increasing a rotation speed of the drive shaft at a pre-determined rate of increase,
    obtaining a rotation speed of the left wheel and a rotation speed of the right wheel, as function of a current shaft slip of the driven axle, wherein a shaft slip is indicative of a difference between a current vehicle velocity and a vehicle velocity corresponding to the rotation speed of the drive shaft, and
    estimating a peak shaft slip value associated with an open differential peak longitudinal force of the driven axle, based on the current shaft slip and on the corresponding obtained speeds of the left and right wheels, and
    maintaining rotation speed of the drive shaft to generate a shaft slip equal to the peak shaft slip value.

\* \* \* \* \*